United States Patent
Yu

(10) Patent No.: US 11,116,175 B2
(45) Date of Patent: Sep. 14, 2021

(54) VENTILATION AND TEMPERATURE REGULATION STRUCTURE FOR ANIMAL HOUSE

(71) Applicant: Ping Yu, Chongqing (CN)

(72) Inventor: Ping Yu, Chongqing (CN)

( * ) Notice: Subject to any disclaimer, the term of this patent is extended or adjusted under 35 U.S.C. 154(b) by 252 days.

(21) Appl. No.: 16/309,564

(22) PCT Filed: Jul. 13, 2017

(86) PCT No.: PCT/CN2017/092783
§ 371 (c)(1),
(2) Date: Dec. 13, 2018

(87) PCT Pub. No.: WO2018/166126
PCT Pub. Date: Sep. 20, 2018

(65) Prior Publication Data
US 2019/0327929 A1    Oct. 31, 2019

(30) Foreign Application Priority Data

Mar. 17, 2017    (CN) .......................... 201710162176.0
May 16, 2017    (CN) .......................... 201720541410.6

(51) Int. Cl.
*A01K 1/00*    (2006.01)

(52) U.S. Cl.
CPC ............ *A01K 1/0052* (2013.01); *A01K 1/007* (2013.01); *A01K 1/0076* (2013.01); *A01K 1/0058* (2013.01); *A01K 1/0082* (2013.01)

(58) Field of Classification Search
CPC .... A01K 1/0052; A01K 1/0058; A01K 1/007; A01K 1/0076; A01K 1/0082

(Continued)

(56) References Cited

U.S. PATENT DOCUMENTS 4,249,461 A * 2/1981 Christenson .............. F24F 7/06
                                                  119/445
4,292,927 A * 10/1981 Sassmann ............ A01K 1/0047
                                                  119/448

(Continued)

FOREIGN PATENT DOCUMENTS

CN    204443517    7/2015
CN    204721989    10/2015

(Continued)

OTHER PUBLICATIONS

International search report dated Nov. 17, 2017 from corresponding application No. PCT/CN2017/092783.

*Primary Examiner* — Brady W Frazier
(74) *Attorney, Agent, or Firm* — Hauptman Ham, LLP

(57) ABSTRACT

A ventilation and temperature regulation structure for an animal house, comprising a house body and a temperature regulation device with a culture layer, the house body comprising a temperature equalization device and an exhaust gas extraction device, the temperature equalization device includes a temperature equalization passage passing through the culture layer, several ventilation holes are disposed on the side wall of the temperature equalization passage; and an outlet end of the temperature regulation device is connected with the temperature equalization passage. Such technical solution is to provide a temperature regulation structure for an animal house having good ventilation, waste reduction and good effect of temperature regulation.

9 Claims, 4 Drawing Sheets

(58) Field of Classification Search
USPC .......................................................... 119/448
See application file for complete search history.

(56) References Cited

U.S. PATENT DOCUMENTS

| | | | | |
|---|---|---|---|---|
| 5,145,460 | A * | 9/1992 | Smith, Jr. ................. | F24F 7/08 |
| | | | | 119/448 |
| 5,666,905 | A * | 9/1997 | Mackin ................ | A01K 1/0047 |
| | | | | 119/448 |
| 6,321,687 | B1 * | 11/2001 | Lemmon ............... | A01K 1/0047 |
| | | | | 119/448 |
| 6,705,251 | B2 * | 3/2004 | Lorton ................. | A01K 1/0052 |
| | | | | 119/437 |
| 8,182,593 | B2 * | 5/2012 | Rapp ..................... | B01D 53/78 |
| | | | | 96/271 |
| 10,212,914 | B1 * | 2/2019 | Reynolds ............. | A01K 1/0047 |
| 10,251,367 | B2 * | 4/2019 | Chang ................ | B01D 46/0027 |
| 2010/0206236 | A1 * | 8/2010 | Pow .......................... | A01J 7/00 |
| | | | | 119/14.02 |
| 2011/0061601 | A1 * | 3/2011 | Correa ................... | A01K 31/04 |
| | | | | 119/437 |
| 2011/0146582 | A1 * | 6/2011 | Lemmon .............. | A01K 1/0052 |
| | | | | 119/448 |
| 2012/0006279 | A1 * | 1/2012 | O'Connor ............... | F23C 10/24 |
| | | | | 119/442 |
| 2012/0067293 | A1 * | 3/2012 | Treloar .................. | B01D 39/04 |
| | | | | 119/448 |
| 2013/0087103 | A1 * | 4/2013 | Glazman ............. | A01K 1/0047 |
| | | | | 119/448 |
| 2014/0096719 | A1 * | 4/2014 | Klocke ................ | A01K 1/0052 |
| | | | | 119/448 |

FOREIGN PATENT DOCUMENTS

| | | |
|---|---|---|
| CN | 205946840 | 2/2017 |
| CN | 106900564 | 6/2017 |
| CN | 107047325 | 8/2017 |
| JP | 63-233232 | 9/1988 |
| KR | 20090056178 | 6/2009 |

* cited by examiner

VENTILATION AND TEMPERATURE REGULATION STRUCTURE FOR ANIMAL HOUSE

RELATED APPLICATIONS

The present application is a National Phase of International Application Number PCT/CN2017/092783, filed Jul. 13, 2017, and claims the priority of China Application No. 201710162176.0, filed Mar. 17, 2017; and China Application No. 201720541410.6, filed May 16, 2017.

FIELD OF THE INVENTION

The present invention relates to the field of animal houses, in particular to a ventilation and temperature regulation structure for an animal house.

BACKGROUND OF THE INVENTION

The animal house used for breeding is the living place of the animal, which indirectly affects the growth and development of the animal. For the existing pig houses, most of the existing pig houses also use traditional pig houses, which are supported by brick walls and roof trusses, and mainly use the cement ground for washing convenience. However, such traditional structure has many disadvantages, such as inconvenience in defecation washing, waste of resources, poor warmth in winter, stuffiness in summer, and poor dryness.

In order to improve such environment, the existing pig houses mainly adopt the hollow floor, so as to facilitate the discharge of feces, and may also solve the problem of dryness, and save resources, a small amount of water can perform the washing. Although the hollow floor solves some of the problems in the animal houses, however, the problems of ventilation cooling in summer and warmth in winter for the animal houses still cannot be solved.

To solve the above problems, based on the existing animal houses, the inventor has invented a new animal house, which had a ventilation passage under the existing animal house, namely under the ground, since such ventilation passage is built under the ground, by utilizing the geothermal heat characteristics of warmth in winter and coolness in summer, the air entering the ventilation passage from the outside may be heated or cooled by the geothermal action, and then transported into the interior of the house to cool the house to some extent. Although such structure can serve to reduce the temperature in summer and keep warm in winter, during the process of use, the inventor found that there are still some problems. The main problems are set as follows: firstly, when the wind is transported into the interior of the house through the ventilation passage, the temperature at the air inlet within the house is closer to the temperature in the ventilation passage, but the animals in the animal house metabolize to generates heat, so that the farther away from the inlet end, the difference between the temperature in the house and the temperature in the ventilation passage is larger, after the measurement, the temperature at the exhaust vent is 3-5° C. lower than the temperature at the air inlet within the house, and temperature uniformity is poor; secondly, the feces produced by the animals in the animal house, although some of which are discharged by the lower fecal passage, avoiding the odor problem caused by the accumulation of feces inside the house, however, in the existing centralized breeding animal houses, the problem of the exhaust gas is still a major problem for farmers.

BRIEF SUMMARY OF THE INVENTION

The technical problem to be solved by the present invention is to provide a ventilation and temperature regulation structure for an animal house having good ventilation and waste reduction and good effect of temperature regulation.

To solve the aforementioned technical problem, the present invention provides the following technical solution: a ventilation and temperature regulation structure for an animal house, comprising a house body and a temperature regulation device with a culture layer, wherein the house body comprises a temperature equalization device and an exhaust gas extraction device, the temperature equalization device comprises a temperature equalization passage passing through the culture layer, a plurality of ventilation holes are disposed on a side wall of the temperature equalization passage; and an outlet end of the temperature regulation device communicates with the temperature equalization passage.

Adopting the ventilation and temperature regulation structure for the animal house of the technical solution of the present invention, the exhaust gas extraction device extracts the exhaust gas from the animal house to the outside of the house, and the exhaust gas in the house may be extracted by the means of a suction pump; the temperature regulation device is used to adjust the temperature inside the house, the temperature regulation device can be the existing geothermal temperature regulation, and can also use a warming and heating device or a cooling air conditioner, or the like, as long as the temperature regulation can be reached; the temperature equalization passage of the temperature equalization device passes through the culture layer, the function is that the air temperature-regulated by the temperature regulation device first enters into the temperature equalization passage, to serve as a buffer effect, and the adjusted air is temporarily stored in the temperature equalization passage; the effect of several ventilation holes is to slowly release the adjusted air stored temporarily into the animal house.

The beneficial effects of the present invention are that: firstly, the temperature equalization device fills the air adjusted by the temperature regulation device from the end to the tail in the culture layer of the animal house, and then gradually releases from the ventilation holes, compared with the previous method that the adjusted air enters from the end of the culture layer, such structure can evenly distribute the adjusted air from the end to the tail of the culture layer, to achieve the effect of temperature equalization; secondly, the exhaust gas extraction device can discharge the exhaust gas in the animal house to achieve the better effect of ventilation and waste reduction.

Furthermore, the temperature regulation device comprises a temperature regulation passage disposed at the bottom of the house body, and the temperature regulation passage is disposed below the ground; an inlet end of the temperature regulation passage communicates with the outside, and an outlet end of the temperature regulation passage communicates with one end of the temperature equalization passage. The temperature regulation device takes the method of the temperature regulation passage disposed below the ground previously invented by the inventor, the external air enters from the inlet end of the temperature regulation passage, is heated or cooled by the geothermal heat under the ground, is discharged from the outlet end of the temperature regulation passage, and then enters the temperature equalization passage. Compared with heating by the heating sheet or cooling by the air conditioner and the like, the temperature regulation passage is more environmentally friendly, more energy saving, and can achieve the effect of heating or cooling by the action of the geothermal heat.

Furthermore, the exhaust gas extraction device comprises an exhaust gas discharge passage disposed in the temperature regulation passage, the bottom of the culture layer is a hollow floor, a feces tank is disposed below the hollow floor, the exhaust gas discharge passage communicates with the upper portion of the feces tank, and the end of the exhaust gas discharge passage communicates with the outside of the house body. A suction pump can be disposed in the exhaust gas discharge passage, or a suction pump can also be disposed at the end or the tail of the exhaust gas discharge passage, to discharge the exhaust gas from the exhaust gas discharge passage, and due to the air pressure generated by the suction pump, the exhaust gas of the culture layer in the animal house, enters the feces tank, and then is discharged from the feces tank, the design of such method is ingenious, the suction pump is disposed in the animal house to extract the exhaust gas, causing the exhaust gas inside the feces tank to escape upwardly, the smell of the culture layer is still unable to be cured, in the structure of the present invention, the exhaust gas discharge passage communicates with the upper portion of the feces tank, the exhaust gas is discharged from the exhaust gas discharge passage through the feces tank, which can fundamentally solve the problem of the exhaust gas, so as to improve the environment in the animal house. Moreover, the exhaust gas discharge passage is positioned in the temperature regulation passage, since the temperature of the exhaust gas is generally higher than the outside air, the air in the temperature regulation passage can be preheated in winter, to further heat the regulated air.

Furthermore, the exhaust gas discharge passage is a metal exhaust pipe, and a branch pipe is disposed between the metal exhaust pipe and the upper portion of the feces tank, and communicates the two with each other. The metal exhaust pipe has a good thermal conductivity, and can be raised to heat the regulated air in the temperature regulation passage, thereby facilitating to raise the air temperature entering the culture layer in winter.

Furthermore, a temperature regulation room is disposed at the outlet end of the temperature regulation passage, a water curtain or a heating sheet is vertically arranged in the temperature regulation room, a closable air vent window is disposed between the temperature regulation room and the house body, and the temperature regulation room communicates with the temperature equalization passage. The temperature regulation room is a house disposed at the end of the temperature regulation passage, to further improve the air temperature entering into the culture layer of the animal house, the water curtain can be added in summer, the temperature can be further lowered by the water curtain, the heating sheet can be used in winter for further heating; the closable air vent window is to allow all the air inside the temperature regulation room to enter the temperature equalization device when the temperature equalization passage is used; when the temperature equalization passage is not used, the air in the temperature regulation room enters the culture layer from the air vent window, which is easy to operate.

Furthermore, a temperature pre-regulation room connected to inlet end of the temperature regulation passage is also included, an external air inlet is disposed in the temperature pre-regulation room, a bottom of the temperature pre-regulation room is connected with the temperature regulation passage, and an exhaust gas discharge pipe and an indoor exhaust passage are disposed in the temperature pre-regulation room; a lower end of the exhaust gas discharge pipe is connected with the exhaust gas discharge passage, and an upper end of the exhaust gas discharge pipe is connected with the top of the temperature pre-regulation room; and a lower end of the indoor exhaust passage is connected with the culture layer of the house body, and an upper end of the indoor exhaust passage is connected with the top of the temperature pre-regulation room. The temperature pre-regulation room serves to pre-regulate the temperature, the upper end of the exhaust gas discharge pipe is connected with the top of the temperature pre-regulation room, since the temperature of the exhaust gas is high, when the exhaust gas is discharged from the exhaust gas discharge pipe, the air entering the temperature regulation passage from the temperature pre-regulation room is preheated in the temperature pre-regulation room, to increase the temperature of the air; and the indoor exhaust passage facilitates the air in the house body to be directly discharged to the outdoor area through the connection of the house body and the temperature pre-regulation room, and be isolated from the air entering the temperature regulation passage to avoid affecting the air quality.

Furthermore, a ventilation building is disposed on the top of the temperature pre-regulation room, and the ventilation building is higher than the top of the house body, an outdoor air outlet is disposed on the ventilation building. The ventilation building is higher than the top of the house body, and the exhaust gas is discharged from the outdoor air outlet, and the ventilation effect is better.

Furthermore, the temperature pre-regulation room is divided into a preheating unit and an exhaust unit that are separated from each other, the exhaust gas discharge pipe is disposed in the preheating unit, and the upper end of the exhaust gas discharge pipe is connected to the ventilation building through the preheating unit; and an insulating roller curtain is disposed between the exhaust unit and the culture layer, and an insulating roller curtain is also disposed between the exhaust unit and the ventilation building. Such solution is one implementing method for the temperature pre-regulation room. The separate plate and the inclined plate divide the temperature pre-regulation room into two units, wherein the left unit is a unit for the fresh air to enter the temperature regulation passage, and the right unit is the indoor exhaust gas discharge unit. The exhaust gas discharge pipe passes through the separate plate via the left unit, on the one hand preheating the fresh air in the left unit, on the other hand, the exhaust gas discharge pipe discharges the exhaust gas from the ventilation building. The lower end of the inclined plate of the right unit is connected to the lower part of the culture layer, to ensure that the air inside the house can escape from the insulating roller curtain between the house body above the lower end of the inclined plate and the temperature pre-regulation house to the ventilation building exhausts, wherein the insulating roller curtain provides the ability to ventilate and keep warm, avoiding heat losses.

Furthermore, the upper end of the exhaust gas discharge pipe passes through the ventilation building and connects with the outside, the indoor exhaust passage is an indoor exhaust pipe disposed in the temperature pre-regulation room, the lower end of the indoor exhaust pipe is connected with the culture layer of the house body, and the upper end of the indoor exhaust pipe passes through the ventilation building and is connected to the outside. Such solution is the other implementing method for the temperature pre-regulation room. The indoor exhaust passage also discharge by means of the indoor exhaust pipe, wherein the indoor exhaust pipe is positioned in the temperature pre-regulation room together with the exhaust gas discharge pipe, thereby heating the air in the temperature pre-regulation room, and preheating the air entering the temperature regulation passage.

Furthermore, a left house body and a right house body with a same structure are included, and the connection between the left house body and the right house body is the temperature regulation room. The use of the bilaterally symmetrical structure saves the space utilization.

Figure 1:
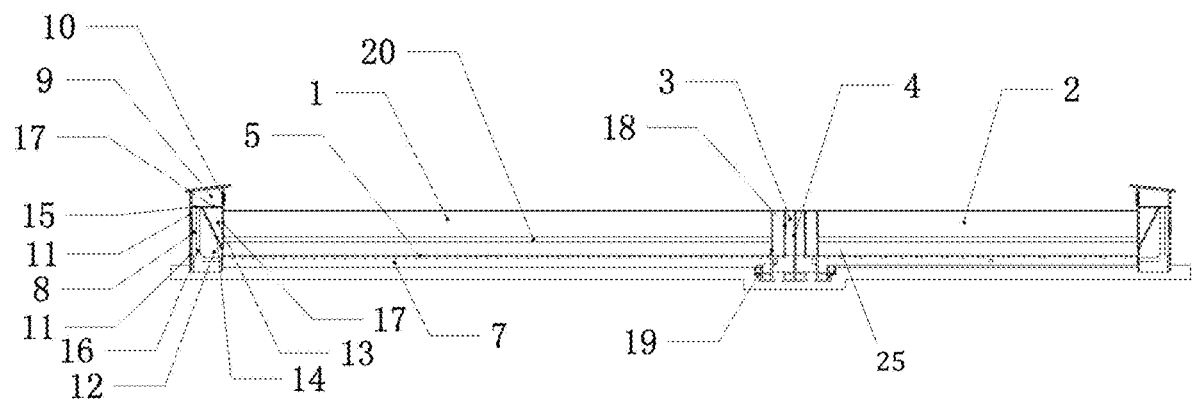
FIG. 1 is a cross-sectional schematic view showing the ventilation and temperature regulation structure for the animal house according to the first example of the present invention.

In the picture: left house body 1, right house body 2, temperature regulation room 3, partition wall 4, hollow floor 5, feces tank 6, temperature regulation passage 7, temperature pre-regulation room 8, ventilation building 9, outdoor air outlet 10, external air inlet 11, preheating unit 12, exhaust unit 13, inclined plate 14, separate plate 15, exhaust gas discharge pipe 16, insulating roller curtain 17, water curtain 18, air vent window 19, temperature equalization passage 20, ventilation hole 21, exhaust gas discharge passage 22, indoor exhaust pipe 24, culture layer 25.

DETAILED DESCRIPTION OF THE EMBODIMENTS

Example 1

As shown in FIG. 1, a ventilation and temperature regulation structure for an animal house of the present invention, comprising a temperature regulation device, a left house body 1 and a right house body 2 both having a culture layer, the structure of the left house body 1 and the right house body 2 are identical, only the left house body 1 is described below, the connection of the two house bodies is the temperature regulation room 3, the temperature regulation rooms 3 of the two house bodies are separated by a separated wall 4.

Figure 2:
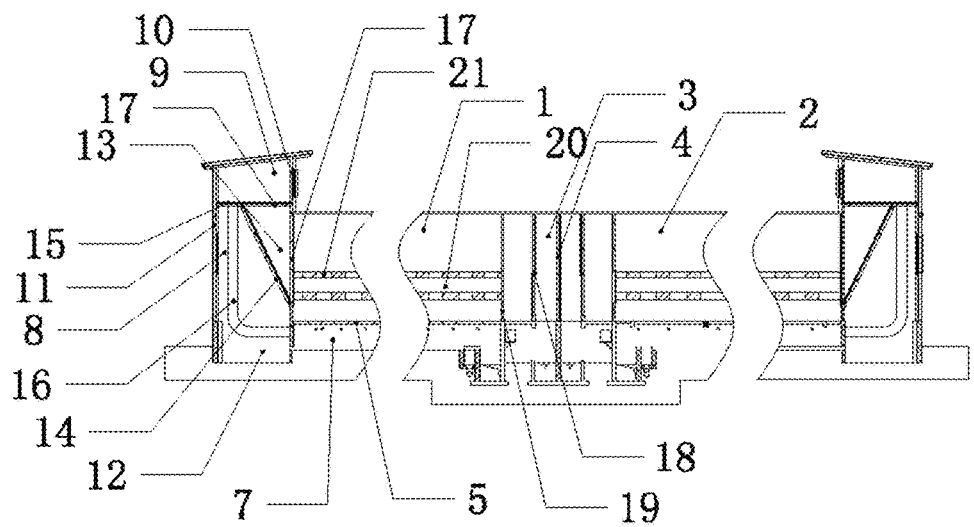
FIG. 2 is an enlarged schematic view of FIG. 1.
Figure 3:
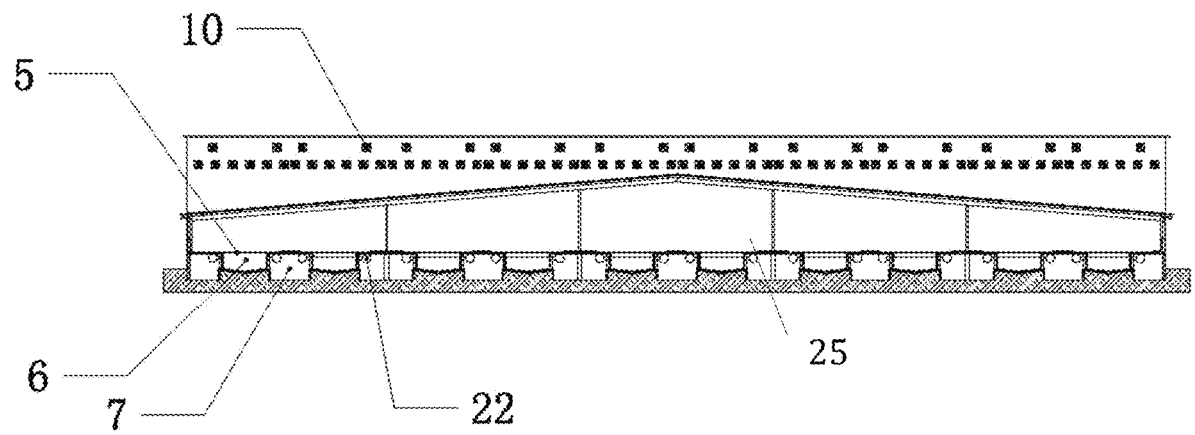
FIG. 3 is a longitudinal sectional schematic view showing the ventilation and temperature regulation structure for the animal house of the present invention.
Figure 4:
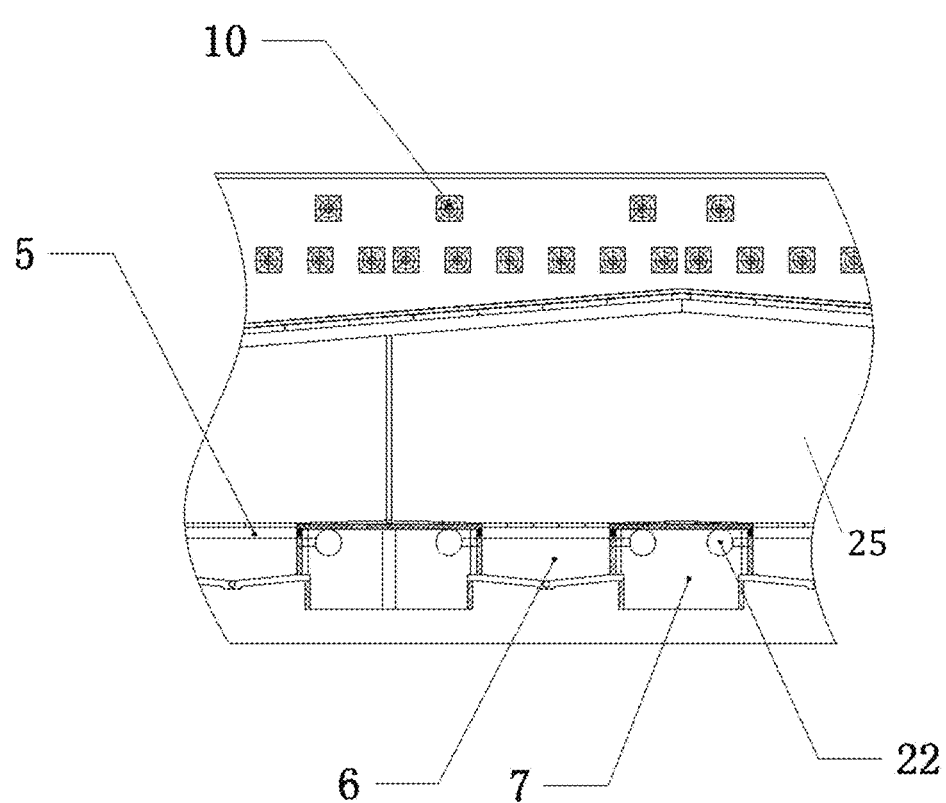
FIG. 4 is an enlarged schematic view of FIG. 3.

As shown in FIG. 2, FIG. 3 and FIG. 4, the bottom of the culture layer is the hollow floor 5, a feces tank 6 is below the hollow floor 5, the temperature regulation device comprises a temperature regulation passage 7 disposed at the bottom of the left house body 1, and the temperature regulation passage 7 is positioned 1 m~2 m below the ground, the inlet end of the temperature regulation passage 7 is connected with the temperature pre-regulation room 8, and the outlet end of the temperature regulation passage 7 is the temperature regulation room 3; a ventilation building 9 is disposed on the top of the temperature pre-regulation room 8, and the ventilation building 9 is higher than the top of the left house body 1, an outdoor air outlet 10 is disposed on the ventilation building 9, an exhaust fan is disposed at the outdoor air outlet 10, the upper portion and the lower portion of the temperature pre-regulation room 8 both have an external air inlet 11, a suction fan is disposed at the external air inlet 11, the interior of the temperature pre-regulation room 8 is divided into a preheating unit 12 and an exhaust unit 13 which are separated with each other, an inclined plate 14 is disposed between the heating unit 12 and the exhaust unit 13, the bottom of the preheating unit 12 is connected with the temperature regulation passage 7, a separate plate 15 is disposed between the top of the preheating unit 12 and the ventilation building 9, an exhaust gas discharge pipe 16 is disposed in the preheating unit 12, and the upper end of the exhaust gas discharge pipe 16 passes through the separate plate 15; and an insulating roller curtain 17 is disposed between the exhaust unit 13 and the culture layer, and an insulating roller curtain 17 is also disposed between the top of the exhaust unit 13 and the ventilation building 9. A water curtain 18 (a heating plate is provided in winter) is vertically disposed in the temperature regulation room 3, and a closable air vent window 19 is disposed between the culture layer of the temperature regulation room 3 and the left house body 1.

An interior of the left house body 1 comprises a temperature equalization device and an exhaust gas extraction device, the temperature equalization device comprises a temperature equalization passage 20 passing through the culture layer, this example uses the temperature equalization pipe, and certainly, can also use other cement passage and the like, several ventilation holes 21 are disposed on the side wall the temperature equalization passage 20, and the temperature regulation room 3 is connected with the end of the temperature equalization passage 20; and the exhaust gas extraction device comprises exhaust gas discharge passage 22 disposed in the temperature regulation passage 7, a suction pump is disposed in the exhaust gas extraction passage, this example uses a metal exhaust pipe made of stainless steel, certainly, can also use other cement exhaust gas discharge passage 22, however, the effect is slightly worse than that of metal, a branch pipe is disposed between the side wall of the metal exhaust pipe and the upper portion of the feces tank 6, and connected the two with each other, and the end of the exhaust gas discharge passage 22 is connected with the exhaust gas discharge pipe 16.

In a specific implementing process, in winter, the air vent window 19 is opened, the external air enters from the external air inlet 11 at the upper portion of the temperature pre-regulation room 8, preheated by the temperature pre-regulation room 8, then enters the temperature regulation passage 7, after heating by the geothermal heat, the heated air enters the temperature regulation room 3, is heated again by the heating plate, and enters the culture layer through the air vent window 19 and the temperature equalization passage 20, due to the insulation in winter, the metabolism of the animals in the house can generate a large amount of heat, therefore the effect of using the temperature equalization passage 20 is not very obvious. For the discharge of the exhaust gas in the left animal house, a portion of the exhaust gas is pumped through the suction pump, the exhaust gas in the culture layer is pumped into the exhaust gas discharge passage 22 through the feces tank 6, then enters the ventilation building 9 from the exhaust gas discharge pipe 16, and is discharged from the external air outlet of the ventilation building 9, when the exhaust gas enters the exhaust gas discharge pipe 16, since the temperature of the exhaust gas is higher than the temperature of the external air, the air in the temperature pre-regulation room 8 can be preheated. The other portion of the exhaust gas enters the exhaust unit 13 through insulating roller curtain 17 between the exhaust unit 13 and culture layer, and then enters the ventilation building 9 through the insulating roller curtain 17 between the exhaust unit 13 and the ventilation building 9, and finally is discharged from the external air outlet of the ventilation building 9.

In summer, the air vent window 19 is closed, the external air enters from the external air inlet 11 at the lower portion of the temperature pre-regulation room 8, since the purpose in summer is to lower temperature, the temperature of the exhaust gas discharge pipe 16 may heat the external air, in order to avoid heating, therefore, the air enters from the external air inlet 11 at the lower portion, directly enters the temperature regulation passage 7, and is cooled by the geothermal heat, the cooled air enters the temperature regulation room 3, is cooled again by the water curtain 18, and enters the culture layer through the temperature equalization passage 20, since several ventilation holes disposed on the side wall of the temperature equalization passage 20, and the temperature equalization passage 20 passes through the culture layer, hence, the cooled air can be slowly and evenly released to the culture layer, according to the calculation, the effect of temperature equalization can be obtained, the temperature difference between the two ends of the culture layer is less than 2° C., the reason that the cooled air can only pass through the temperature equalization passage 20 is that, due to the cooling effect in summer, if the cooled air can also be discharged from the air vent window 19, such method is the same as the existing method of direct entry, which causes the temperature difference of the two ends to be greater than 3-5° C. For the discharge of the exhaust gas in the left animal house 1, the suction pump is turned off, thereby preventing the exhaust gas from heating the air in the temperature pre-regulation room 8. The exhaust gas enters the exhaust unit 13 through the insulating roller curtain 17 between the exhaust unit 13 and the culture layer, then enters the ventilation building 9 through the insulating roller curtain 17 between the exhaust unit 13 and the ventilation building 9, and is finally discharged from the external air outlet of the ventilation building 9.

Example 2

Figure 5:
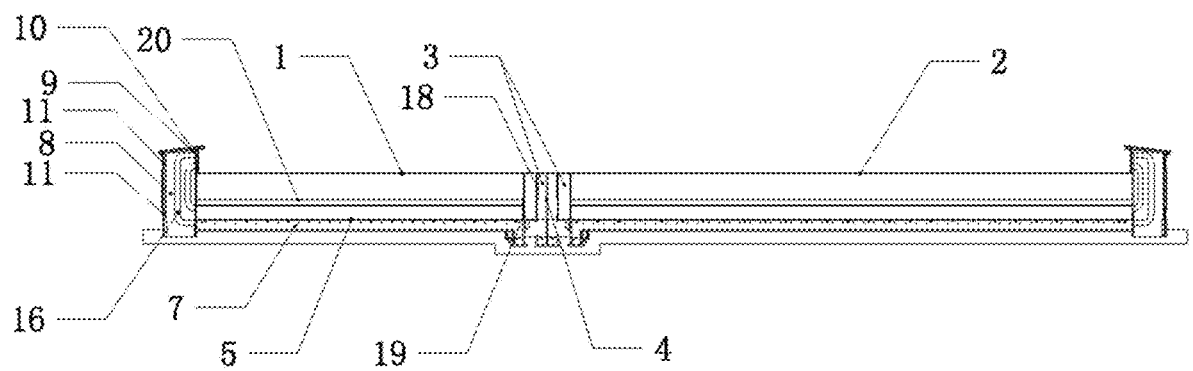
FIG. 5 is a cross-sectional schematic view showing the ventilation and temperature regulation structure for the animal house according to the second example of the present invention.
Figure 6:
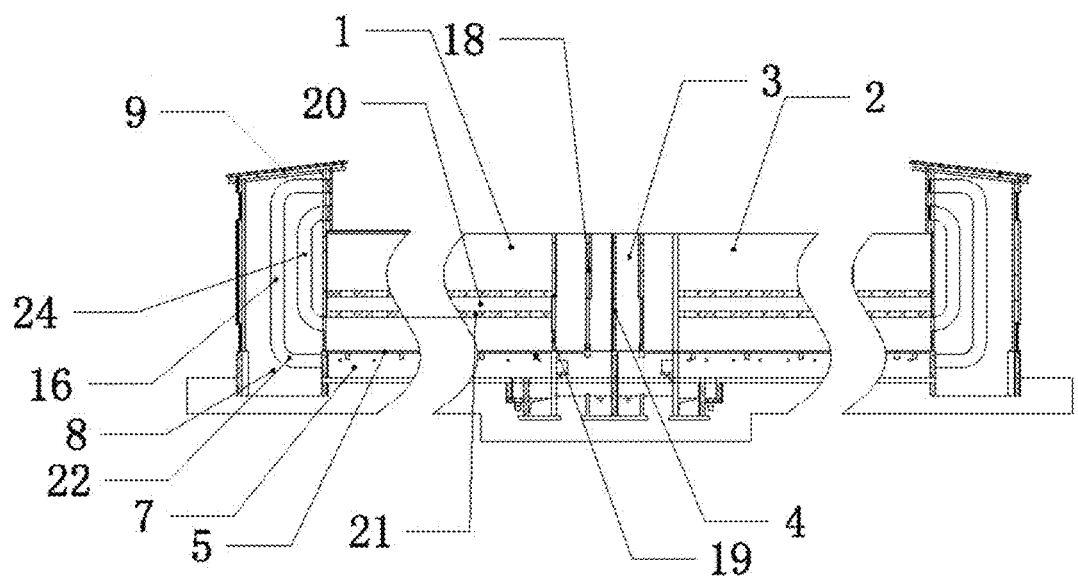
FIG. 6 is an enlarged schematic view of FIG. 5.

As shown in FIG. 5, FIG. 6, the differences from Example 1 are that: the structure of the temperature pre-regulation room 8, is replaced by: the temperature pre-regulation room 8 is a house disposed at the end of the left house body 1, the upper portion and the lower portion of the temperature pre-regulation room 8 are still have the external air inlet 11, and the suction fan is still disposed on each external air inlet 11, the ventilation building 9 is also disposed on the top of the temperature pre-regulation room 8, and the ventilation building 9 is higher than the top of the left house body 1, outdoor air outlet 10 is also disposed on the ventilation building 9, the exhaust fan is disposed at the outdoor air outlet 10, the exhaust gas discharge pipe 16 and the indoor exhaust pipe 24 are disposed in the temperature pre-regulation room 8, the upper end of the exhaust gas discharge pipe 16 passes through the ventilation building 9 and connects with the outside, the lower end of the exhaust gas discharge pipe 16 connects with the exhaust gas discharge passage 22, and the exhaust fan is disposed at the connection; and the upper end of the indoor exhaust pipe 24 passes through the ventilation building 9 and connects with the outside, and the exhaust fan is also disposed at the connection, the lower end of the indoor exhaust pipe 24 connects with the culture layer of the left house body 1.

In a specific implementing process, the differences from the Example 1 are that: the exhaust gas discharged from the exhaust gas discharge passage 22 enters the exhaust gas discharge pipe 16 and is discharged directly to the outside by the exhaust fan, the other portion of the indoor exhaust gas enters the indoor exhaust pipe through the culture layer, and is discharged directly to the outside by the indoor exhaust pipe 24.

Example 3

The difference from the Example 1 is that: there is only the left animal house 1, and no right animal house.

Example 4

Figure 7:
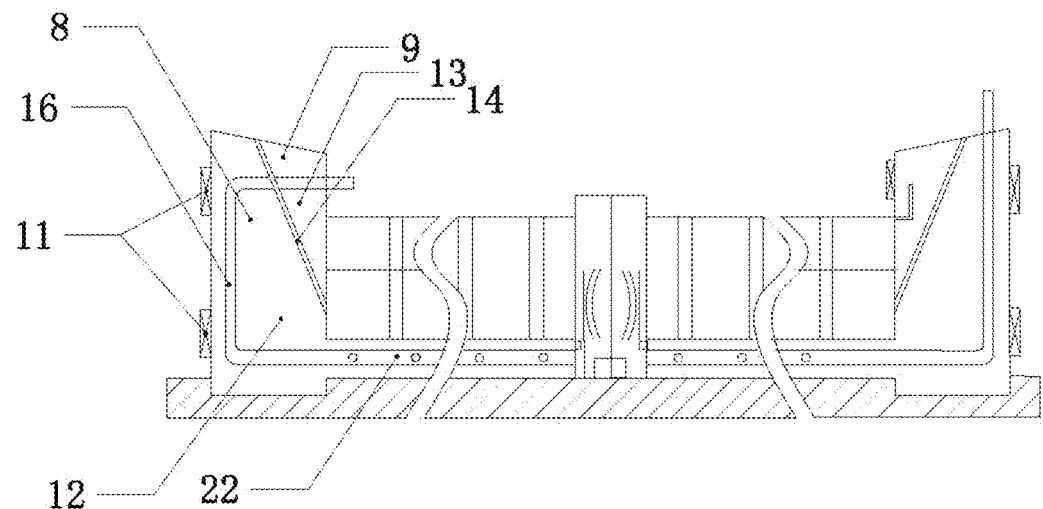
FIG. 7 is an enlarged diagrammatic cross-sectional view showing the forth example.

As shown in FIG. 7, the differences from the Example 1 are that: one end of the inclined plate 14 is located on the top of the ventilation building 9, and the other end of the inclined plate 14 is located on the separate wall of the left animal house 1, the upper end of exhaust gas discharge pipe 16 transversely passes through the ventilation building 9, and is located inside of the ventilation building 9.

Example 5

Figure 8:
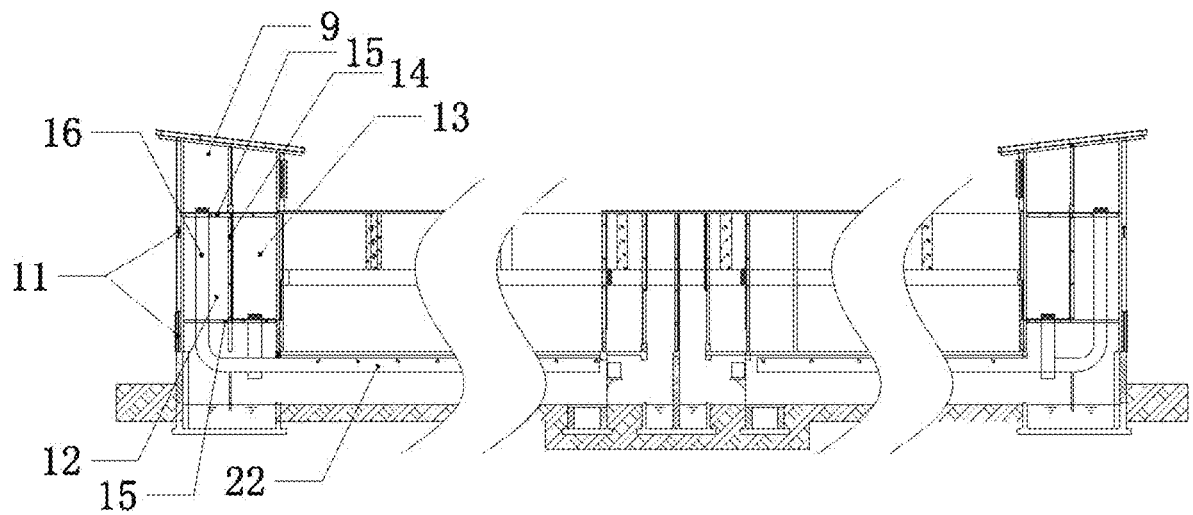
FIG. 8 is an enlarged diagrammatic cross-sectional view showing the fifth example.

As shown in FIG. 8, the differences from the Example 1 are that: the inclined plate 14 is a vertical plate, the separate plate 15 is disposed between the ventilation building 9 and the temperature pre-regulation room 8, and at the lower portion of the temperature pre-regulation room 8, the lower end of the inclined plate 14 is located at the separate plate 15 disposed at the lower portion of the temperature pre-regulation room 8, the upper end of the inclined plate 14 is located at the separate plate 15 between the ventilation building 9 and the temperature pre-regulation room 8, a water curtain is disposed in the ventilation building 9, so as to reduce the hazards of the odor, and reduce the odor pollution environment discharged from the exhaust gas discharge pipe 16 to the external environment via the ventilation building 9, the top end of the exhaust gas discharge pipe 16 passes through the separate plate 15 between the ventilation building 9 and the temperature pre-regulation room 8 and is disposed in the ventilation building 9.

For the person skilled in the art, without departing from the structure of the present invention, a plurality of variations and improvements can be performed, which should also be regarded as the protection scope of the present invention, and may not affect the implementing effects of the present invention and the utility of the patent.

What is claimed is:

1. A ventilation and temperature regulation structure for an animal house, comprising
  a house body,
  a temperature regulation passage,
  a culture layer,
    wherein: the house body comprises
      a temperature equalization passage passing through the culture layer and
      an exhaust gas extraction passage,
        wherein
          a side wall of the temperature equalization passage comprises several ventilation holes; and an outlet end of the temperature regulation passage is communicated with the temperature equalization passage, and a temperature pre-regulation room communicated with an inlet end of the temperature regulation passage, wherein an external air inlet is disposed in the temperature pre-regulation room, a bottom of the temperature pre-regulation room is communicated with a temperature regulation passage, and an exhaust gas discharge pipe and an indoor exhaust passage are disposed in the temperature pre-regulation room;

wherein a lower end of the exhaust gas discharge pipe is communicated with an exhaust gas discharge passage, and an upper end of the exhaust gas discharge pipe is communicated with a top of the temperature pre-regulation room; and a lower end of the indoor exhaust passage is communicated with the culture layer of the house body, and an upper end of the indoor exhaust passage is communicated with a top of the temperature pre-regulation room.

2. The ventilation and temperature regulation structure for the animal house according to claim 1, wherein, the temperature regulation passage is disposed at a bottom of the house body, and the temperature regulation passage is disposed under a hollow floor; and the inlet end of the temperature regulation passage is communicated with an outside of the house body, and an outlet end of the temperature regulation passage is communicated with one end of the temperature equalization passage.

3. The ventilation and temperature regulation structure for the animal house according to claim 2, wherein, the exhaust gas discharge passage is disposed in the temperature regulation passage, the hollow floor is disposed at a bottom of the culture layer, a feces tank is disposed below the hollow floor, the exhaust gas discharge passage is communicated with an upper portion of the feces tank, and an end of the exhaust gas discharge passage is communicated with the outside of the house body.

4. The ventilation and temperature regulation structure for the animal house according to claim 1, wherein, the exhaust gas discharge passage is a metal exhaust pipe.

5. The ventilation and temperature regulation structure for the animal house according to claim 2, wherein, a temperature regulation room is disposed at the outlet end of the temperature regulation passage, a water curtain or a heating plate is vertically disposed in the temperature regulation room, a closable air vent window is disposed between the temperature regulation room and the house body, and the temperature regulation room is communicated with the temperature equalization passage.

6. The ventilation and temperature regulation structure for the animal house according to claim 1, wherein, a ventilation building is disposed on the top of the temperature pre-regulation room, and the ventilation building is higher than a top of the house body, and an outdoor air outlet is disposed on the ventilation building, wherein air from inside the ventilation and temperature regulation structure flows to the outside of the house body through the outdoor air outlet.

7. The ventilation and temperature regulation structure for the animal house according to claim 6, wherein, the temperature pre-regulation room is divided into a preheating unit and an exhaust unit that are separated from each other, the exhaust gas discharge pipe is disposed in the preheating unit, and the upper end of the exhaust gas discharge pipe is connected with the ventilation building passing through the preheating unit; and an insulating roller curtain is disposed between the exhaust unit and the culture layer, and an insulating roller curtain is also disposed between the exhaust unit and the ventilation building.

8. The ventilation and temperature regulation structure for the animal house according to claim 6, wherein, the upper end of the exhaust gas discharge pipe is communicated with the outside of the house body passing through the ventilation building, the indoor exhaust passage is an indoor exhaust pipe disposed in the temperature pre-regulation room, a lower end of the indoor exhaust pipe is communicated with the culture layer of the house body, and an upper end of the indoor exhaust pipe passes through the ventilation building to communicate with the outside of the house body.

9. The ventilation and temperature regulation structure for the animal house according to claim 7, wherein, comprising a left house body and a right house body with the same structure, and the connection of the left house body and the right house body is the temperature regulation room.

* * * * *